(12) United States Patent
Klassen et al.

(10) Patent No.: US 8,818,349 B2
(45) Date of Patent: Aug. 26, 2014

(54) MOBILE DEVICE DIAGNOSIS, TEST, APPLICATION DEPLOYMENT AND UPDATE FROM A WEB PAGE

(75) Inventors: Gerhard D. Klassen, Waterloo (CA); Garth Newton, Waterloo (CA); Christopher R. Wormald, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1237 days.

(21) Appl. No.: 11/097,285

(22) Filed: Apr. 4, 2005

(65) Prior Publication Data
US 2006/0073785 A1    Apr. 6, 2006

Related U.S. Application Data

(60) Provisional application No. 60/615,582, filed on Oct. 5, 2004.

(51) Int. Cl.
| | |
|---|---|
| *H04M 3/00* | (2006.01) |
| *H04L 29/08* | (2006.01) |
| *H04W 76/00* | (2009.01) |
| *H04W 24/00* | (2009.01) |
| *H04W 4/00* | (2009.01) |
| *H04W 28/18* | (2009.01) |

(52) U.S. Cl.
CPC .............. *H04L 67/34* (2013.01); *H04W 24/00* (2013.01); *H04L 67/04* (2013.01); *H04L 67/02* (2013.01); *H04W 4/00* (2013.01); *H04W 76/005* (2013.01); *H04W 28/18* (2013.01)
USPC .............................................. 455/419; 710/8

(58) Field of Classification Search
USPC ......... 455/41.2, 66.1, 425, 67.11, 414.1, 418; 709/203, 213
See application file for complete search history.

(56) References Cited

U.S. PATENT DOCUMENTS

| 6,341,316 B1 * | 1/2002 | Kloba et al. .................. 709/248 |
| 6,714,797 B1 | 3/2004 | Rautila |

(Continued)

FOREIGN PATENT DOCUMENTS

| EP | 1376990 | 1/2004 |
| WO | WO9961983 | 12/1999 |

(Continued)

OTHER PUBLICATIONS

International Search Report of PCT International Application No. PCT/CA2005/000498, mailed Jul. 25, 2005.

(Continued)

*Primary Examiner* — Tu X Nguyen
(74) *Attorney, Agent, or Firm* — Norton Rose Fulbright Canada LLP (57) ABSTRACT

A method for deploying an application to a mobile device comprises providing a web page to a computing device coupled to a communications network for receiving the web page, the web page comprising a configuration determination and loading component for deploying the application to the mobile device coupled to the computing device, the web page determining configuration information about the mobile device for determining specific application components for loading; and providing specific application components for loading onto the mobile device in response to the web page. The web page may determine specific application components for the mobile device in response to the configuration information.

15 Claims, 5 Drawing Sheets

(56) References Cited

U.S. PATENT DOCUMENTS

| | | | |
|---|---|---|---|
| 6,735,691 B1* | 5/2004 | Capps et al. ............... 713/1 |
| 6,941,135 B2* | 9/2005 | Minear et al. ............ 455/419 |
| 2001/0047394 A1* | 11/2001 | Kloba et al. ............... 709/217 |
| 2001/0051979 A1* | 12/2001 | Aufricht et al. ............ 709/203 |
| 2002/0052916 A1 | 5/2002 | Kloba et al. |
| 2003/0236867 A1 | 12/2003 | Natsuno et al. |
| 2004/0122908 A1* | 6/2004 | Konopka et al. .......... 709/208 |

FOREIGN PATENT DOCUMENTS

| | | |
|---|---|---|
| WO | WO 03/019865 | 3/2003 |
| WO | WO03047287 | 6/2003 |
| WO | WO03090492 | 10/2003 |

OTHER PUBLICATIONS

Canadian Intellectual Property Office, Examiner's Requisition dated Dec. 7, 2010, issued in Canadian Patent Application No. 2,583,184.

Ogilvy Renault, Response to Examiner's Requisition dated May 25, 2011, filed in Canadian Patent Application No. 2,583,184.

Canadian Intellectual Property Office, Notice of Allowance dated Jan. 1, 2012, issued in Canadian Patent Application No. 2,583,184.

European Patent Office, Supplementary European Search Report dated Jan. 23, 2008, issued in European Patent Application No. 05730092.3.

European Patent Office, Examination Report dated Mar. 17, 2008, issued in European Patent Application No. 05730092.3.

IPULSE, Response to Examination Report dated May 16, 2008, filed in European Patent Application No. 05730092.3.

European Patent Office, Examination Report dated May 30, 2008, issued in European Patent Application No. 05730092.3.

IPULSE, Response to Examination Report dated Sep. 23, 2008, filed in European Patent Application No. 05730092.3.

European Patent Office, Intent to Grant dated Jan. 13, 2010, issued in European Patent Application No. 05730092.3.

European Patent Office, Decision to Grant dated May 17, 2010, issued in European Patent Application No. 05730092.3.

Intellectual Property India, First Examination Report dated Jul. 27, 2011, issued in Indian Patent Application No. 2671/DELNP/2007.

Anand and Anand, Response to First Examination Report dated Jun. 12, 2012, filed in Indian Patent Application No. 2671/DELNP/2007.

State Intellectual Property Office of People's Republic of China, First Office Action dated Feb. 5, 2010, issued in Chinese Patent Application No. 200580041657.1.

State Intellectual Property Office of People's Republic of China, Second Office Action dated Oct. 24, 2011, issued in Chinese Patent Application No. 200580041657.1.

State Intellectual Property Office of People's Republic of China, Third Office Action dated Jul. 23, 2012, issued in Chinese Patent Application No. 200580041657.1.

International Preliminary Examining Authority/CA, International Search Report dated Jul. 20, 2005, issued in International Application No. PCT/CA2005/000498.

International Preliminary Examining Authority/CA, Written Opinion dated Jul. 20, 2005, issued in International Application No. PCT/CA2005/000498.

Ogilvy Renault, Amendment Under Article 19 dated Oct. 25, 2005, filed in International Application No. PCT/CA2005/000498.

Ogilvy Renault, Article 34 Amendment dated Aug. 1, 2006, filed in International Application No. PCT/CA2005/000498.

International Preliminary Examining Authority/CA, International Preliminary Report on Patentability dated Feb. 13, 2007, issued in International Application No. PCT/CA2005/000498.

\* cited by examiner

MOBILE DEVICE DIAGNOSIS, TEST, APPLICATION DEPLOYMENT AND UPDATE FROM A WEB PAGE

CROSS-REFERENCE

This application claims the benefit of U.S. Provisional Application No. 60/615,582 filed Oct. 5, 2004.

FIELD OF THE INVENTION

This invention relates to the field of mobile devices, more particularly to their diagnosis, test, application deployment and update from a web page.

BACKGROUND

Mobile devices including wireless communication devices, such as cellular phones, personal digital assistants and the like, include microprocessors, input devices including a keypad, special function buttons and wheels, output devices, information storage capabilities, and run one or more software applications. Examples of software applications used in these wireless devices include micro-browsers, address books, and email clients. Additionally, current generations of such devices have access to a plurality of services via the Internet. A wireless device may, for example, be used to browse web sites on the Internet, to transmit and receive graphics, and to execute streaming audio and/or video applications.

Once the device has left the factory, in order to install an application onto a mobile device a user or service technician typically downloads the application and installs it onto a PC, connects the mobile device to the PC and runs the installer on the PC to load the application onto the device. This process requires the two steps of downloading to the PC and then to the mobile device. But another problem is that often there are multiple different forms of the application to be installed which vary depending on the intended target mobile device. The application to be downloaded may need to be selected or configured based on the specific hardware model or version of the operating system, the carrier or the deployment system for the mobile device.

Currently, a way to deal with this problem is to either: (a) ask the user to specify the mobile device's model in the first step of the download or (b) include all the different forms of the application in the first download. Solution (a) is problematic because it may not be easy for the user to tell which model the user has or what version of the operating system is on the device. Furthermore this is a compounded problem if the software is being installed on a PC with the intent of deploying it to multiple mobile devices (e.g. in an enterprise context). Solution (b) may contribute dramatically to the size of the initial download. A problem which may occur with both solutions, but particularly (b), happens when the application is updated between the first two steps (e.g. a new model comes out) there is no way to update the applications.

As well, another problem is that often an application may need to remove or update other software in order to run successfully. A similar problem exists when users wish to report a bug or diagnose a problem with their mobile device. It is often difficult for users to obtain the appropriate information required to successfully diagnose a problem.

Accordingly, a solution that addresses, at least in part, the above and other shortcomings is desired.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

There is provided a web page-based mobile device diagnosis, test, application deployment and update solution. According to one aspect of the invention, there is provided a method for deploying an application to a mobile device. The method comprises (i) providing a web page to a computing device coupled to a communications network for receiving the web page, the web page comprising a configuration determination and loading component for deploying the application to the mobile device coupled to the computing device, said web page determining configuration information about the mobile device for determining specific application components for loading; and (ii) providing specific application components for loading onto the mobile device. The web page may determine specific application components for said mobile device in response to the configuration information. Other aspects of the invention such as system and computer program aspects will be apparent to those of ordinary skill in the art.

In accordance with an embodiment of the invention, mobile devices may be diagnosed and tested and applications therefor deployed or updated to the device via a web page-based loader for a user's personal computer (PC). A user may navigate to a predetermined web page which prompts the user to connect a mobile device to the PC. The web page may be able to automatically detect a connected device, or the user may reply to the page to indicate that a device has been connected. The web page then communicates with the connected device to determine specific configuration information for the connected device. This configuration information may include the exact hardware model, the operating system version, the status of other installed applications, the amount of available resources (e.g. non-volatile storage local to the device), etc.

The web page may be updated in response to this information, for example, to include information on whether the connected device is supported, instructions on whether the user may have to free up additional non-volatile storage space on the device, or indicate that the user may load a desired application.

When the user responds that the user desires to load the application to the device, the web server is instructed via the web page to only download and install the exact configuration of the application required for the connected device.

As the loader is able to determine what other applications are installed on the connected device it is able also to update other modules that the application may depend on, or remove modules which may be unauthorized or cause problems on the device (e.g. virus removal).

The application may be deployed or updated to further devices in the same way. New software may be downloaded if subsequent devices require different versions, or a cached version stored locally to the user's PC may be used.

The same technique may be applied to allow a user to report or diagnose an error condition on their device. The web page may be used to glean detailed information from the connected device (including device screen shots) to include in an error report, or to be used by technical support personnel. Tests may also be initiated.

Furthermore the web page may be used to automatically update software or configuration as controlled by the web page, possibly with the help of a technical support person.

Figure 1:
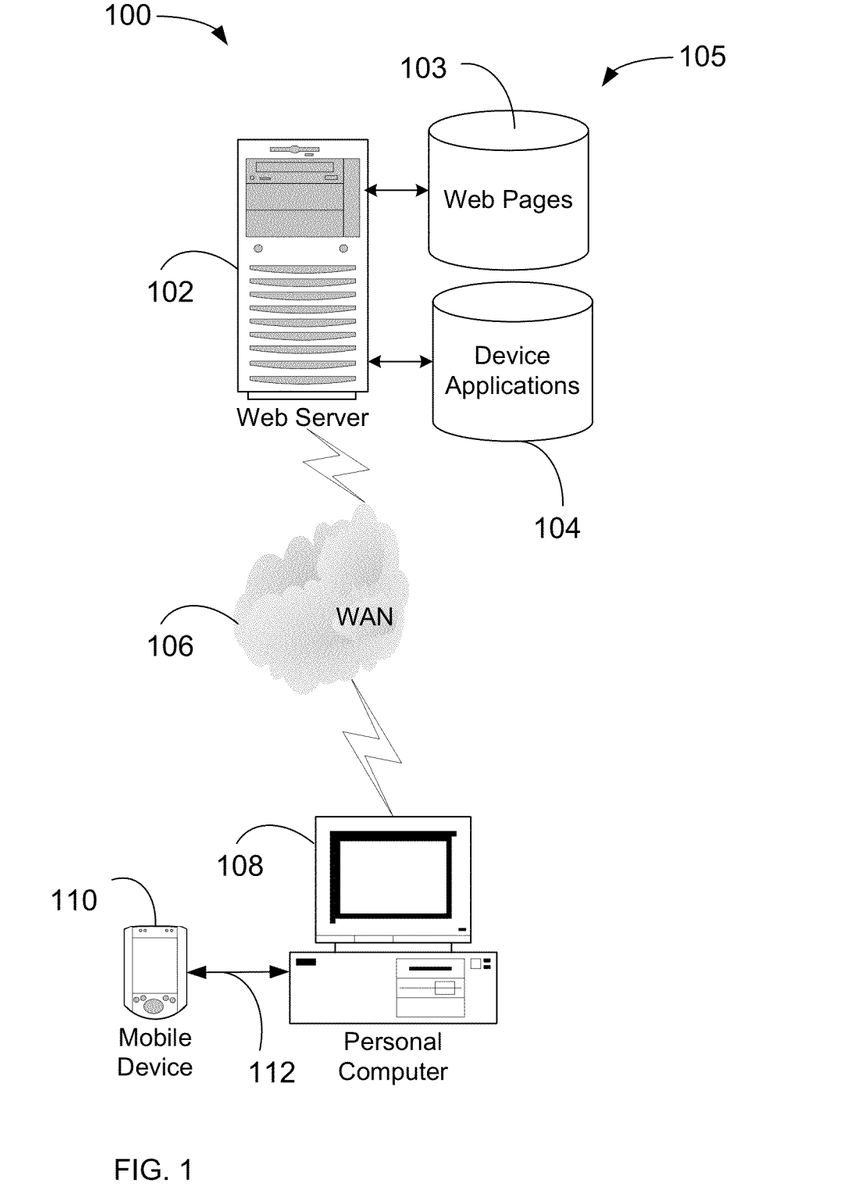
FIG. 1 is a block diagram of a simplified example system for a mobile device diagnosis, test, application deployment and update from a web page in a accordance with an embodiment of the invention.

FIG. 1 is a block diagram of a simplified example system 100 for a mobile device diagnosis, test, application deployment and update from a web page in accordance with an embodiment of the invention. System 100 includes a web server 102 coupled for communication with a store (e.g. database) for web pages 103 and device applications 104 (collectively website 105). The web pages 103 typically comprise HyperText Mark-up Language (HTML) documents and other embedded or linked objects such as Java™-based Applets™ (Java and Applet are trademarks of Sun Microsystems Inc.) or ActiveX™ controls (ActiveX is a trademark of Microsoft Corp.). Such Applets and ActiveX controls are useful for providing objects for execution on a client of the server 102, such as a web browser application of a personal computer to extend the operability of a web page. Device applications 104 comprise various software objects, definitions, etc. for defining an application for or configuring a mobile device. An example of such an application is an instant messenger application for exchanging messages among "friends" in a communications network. Other applications or components may include games, appointment calendars, operating system device drivers, etc.

Web server 102 provides the web pages 103 and device applications 104 to clients via a coupling to a communications network which in the present embodiment is a wide area network (WAN) 106. WAN 106 may be the Internet or other private or public network, supporting Internet protocols such as HyperText Transfer Protocol (HTTP) for web-based communications. Such communications may be secured using common Internet protocols well known to persons of ordinary skill in the art. Persons of ordinary skill in the art will further appreciate that web site 105 is simplified for purposes of the present disclosure and that numerous modifications to the web site arrangement may be made for different purposes such as security, scalability, etc.

Further coupled for communication with WAN 106 is a PC 108 for a user of a mobile device 110. Mobile device 110 is coupled via coupling 112 for communication with PC 108 in accordance with a feature of the invention for diagnosis, test, application deployment and update via web site 105. Coupling 112 may comprise a wired connection (e.g. serial-based Universal Serial Bus (USB)) or wireless connection (e.g. Bluetooth™. Bluetooth™ is a registered trademark of Bluetooth SIG, Inc.). Though not shown, PC 108 may comprise a laptop, workstation or other computing device adapted for web-based communication with website 105 and communication with mobile device 110. PC 108 may in fact comprise a second mobile device. In addition to operating system and communications software, PC 108 will typically comprise a web browser for navigating, displaying and interacting with website 105. Additionally, PC 108 may include software for configuring and communicating with mobile device 110, for example, to synchronize data on mobile device with similar data (e.g. email, calendar, notes) on PC 108 or a remote store coupled thereto (not shown).

Figure 2:
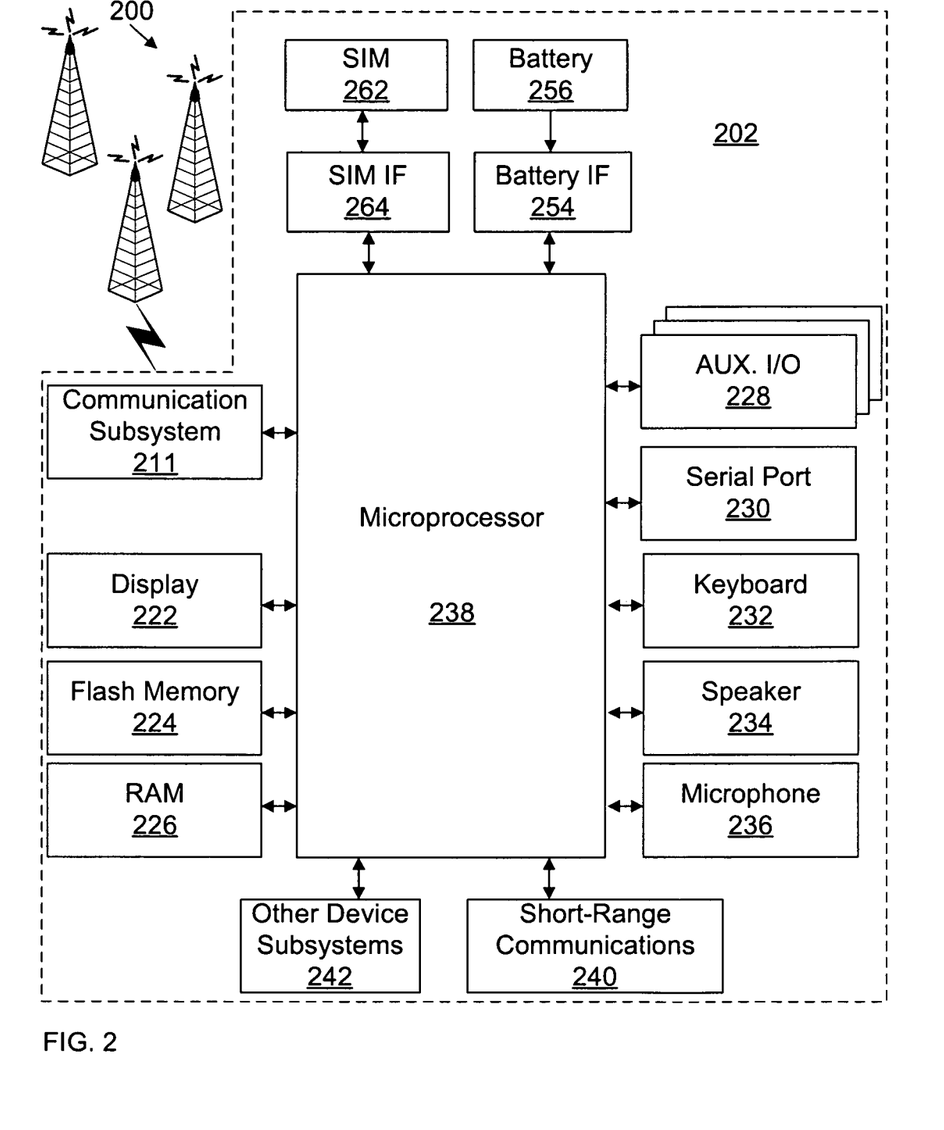
FIG. 2 is a block diagram of an example mobile device adaptable for diagnosis, test, application deployment and update from a web page in a accordance with an embodiment of the invention of FIG. 1.

FIG. 2 is a block diagram of a an example mobile device (wireless communication device) 202 suitable for use with the embodiment of the invention shown in FIG. 1. Device 202 is a two-way communication device having at least voice and advanced data communication capabilities, including the capability to communicate with other computer systems. Depending on the functionality provided by device 202, it may be referred to as a data messaging device, a two-way pager, a cellular telephone with data messaging capabilities, a wireless Internet appliance, or a data communication device (with or without telephony capabilities). Device 202 may communicate with any one of a plurality of fixed transceiver stations 200 within its geographic coverage area.

Device 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 211 depends on the communication network in which device 202 is intended to operate.

Network access is associated with a subscriber or user of device 202 and therefore device 202 requires a Subscriber Identity Module or "SIM" card 262 to be inserted in a SIM IF 264 in order to operate in the network. Device 202 is a battery-powered device so it also includes a battery IF 254 for receiving one or more rechargeable batteries 256. Such a battery 256 provides electrical power to most if not all electrical circuitry in device 202, and battery IF 254 provides for a mechanical and electrical connection for it. The battery IF 254 is coupled to a regulator (not shown) which provides power V+ to all of the circuitry.

Device 202 includes a microprocessor 238 which controls overall operation of device 202. Communication functions, including at least data and voice communications, are performed through communication subsystem 211. Microprocessor 238 also interacts with additional device subsystems such as a display 222, a flash memory 224 or other persistent store, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on device 202. A predetermined set of applications which control basic device operations, including at least data and voice communication applications, will normally be installed on device 202 during its manufacture. A preferred application that may be loaded onto device 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 102 with respect to such items. This is especially advantageous where the host computer system is the mobile station user's office computer system.

Additional applications may also be loaded onto device 202 through network 200, an auxiliary I/O subsystem 228, serial port 230, short-range communications subsystem 240, or any other suitable subsystem 242, and installed by a user in RAM 226 or preferably a non-volatile store (e.g. flash memory 224) for execution by microprocessor 238. Such flexibility in application installation increases the functionality of device 202 and may provide enhanced on-device functions, communication-related functions, or both. For example, secure communication applications may enable electronic commerce functions and other such financial transactions to be performed using device 202.

In a data communication mode, a received signal such as a text message, an e-mail message, or web page download will be processed by communication subsystem 211 and input to microprocessor 238. Microprocessor 238 will preferably further process the signal for output to display 222 and/or to auxiliary I/O device 228. A user of device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211 or short range communication subsystem 240.

For voice communications, the overall operation of device 202 is substantially similar, except that the received signals would be output to speaker 234 and signals for transmission would be generated by microphone 236. Alternative voice or audio I/O subsystems, such as a voice message recording subsystem, may also be implemented on device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization or other communication with a user's personal computer is a desirable, albeit optional, component. Serial port 230 enables a user to set preferences through an external device or software application and extends the capabilities of device 202 by providing for information or software downloads to device 202 other than through a wireless communication network. The alternate download path may, for example, be used to load an encryption key onto device 202 through a direct and thus reliable and trusted connection to thereby provide secure device communication.

Short-range communications subsystem 240 of FIG. 1 is an additional optional component which provides for communication between device 202 and different systems or devices, which need not necessarily be similar devices. For example, subsystem 240 may include an infrared device and associated circuits and components, or a Bluetooth™ communication module to provide for communication with similarly-enabled systems and devices.

Figures 3, 4:
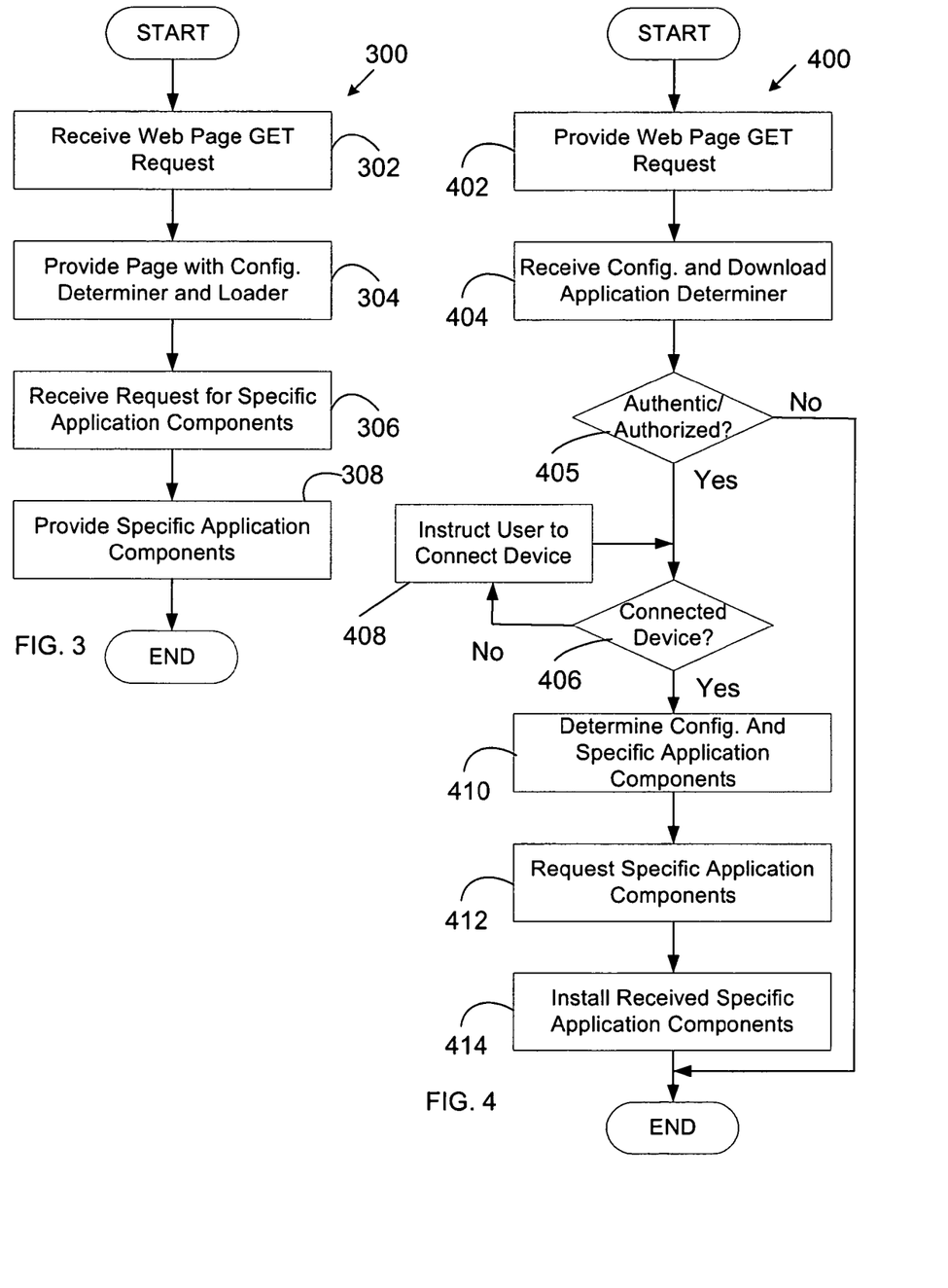
FIGS. 3 and 4 are flow charts illustrating operations to diagnose a mobile device and deploy an application in accordance with an embodiment of the invention.
Figure 5:
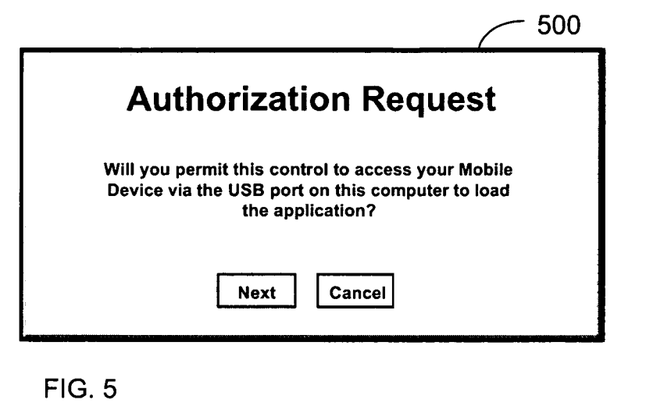
FIGS. 5-10 are representative user interface views (web page screen shots) of operations to diagnose a mobile device and deploy an application in accordance with the embodiment of the invention of FIGS. 3 and 4.
Figure 6:
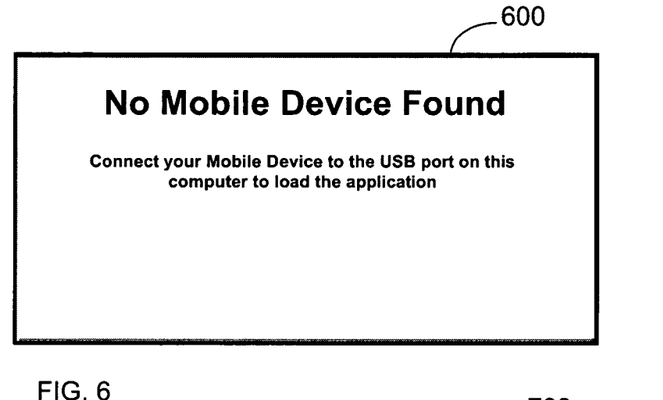
Figure 7:
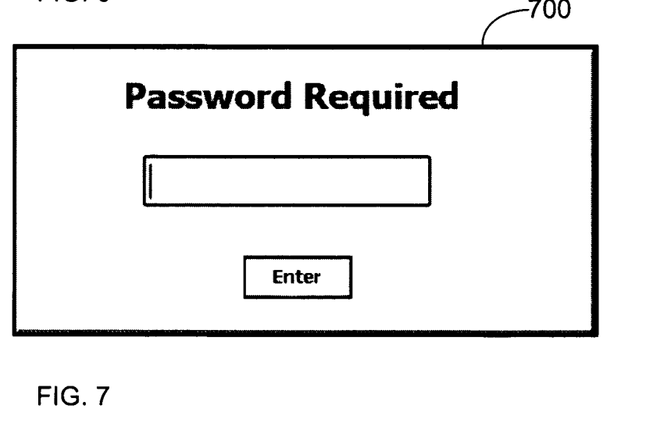
Figure 8:
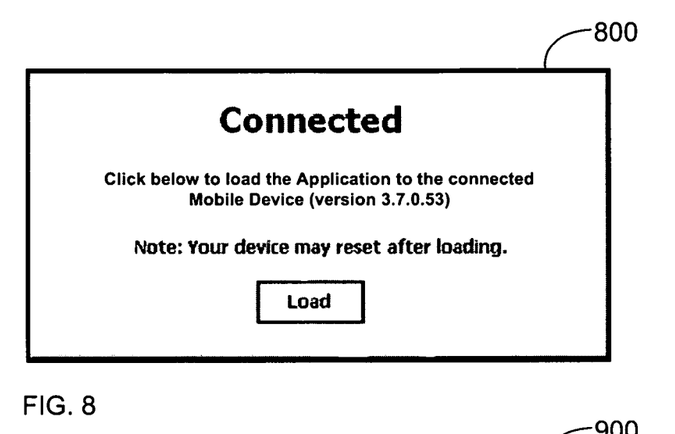
Figure 9:
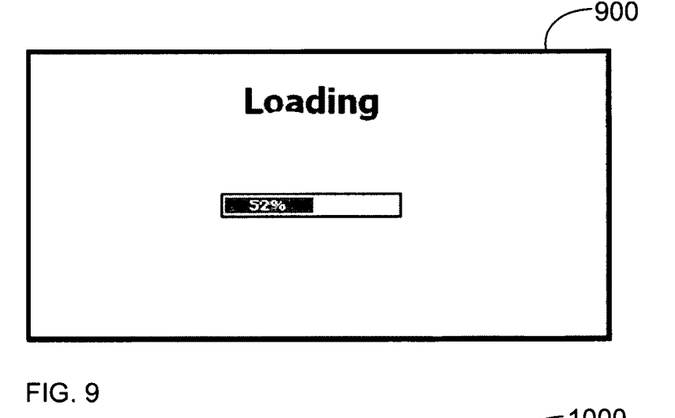
Figure 10:
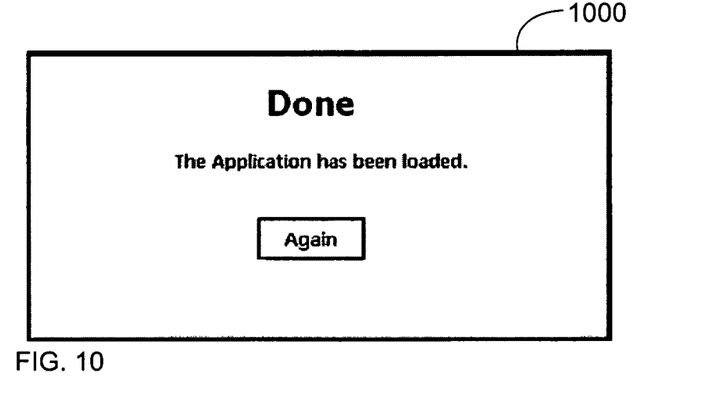

FIGS. 3 and 4 are flow charts illustrating operations 300 and 400 respectively to diagnose a mobile device and deploy an application in accordance with an embodiment of the invention. FIG. 3 represents operations 300 from a web server perspective and FIG. 4 operations 400 from a client PC perspective. A user desiring to deploy an application to mobile device 110 navigates to a predetermined web page 103 of site 105, for example, a page configured for downloading a specific application. Operations 300 commence upon the receipt of a GET for the web page (step 302). Web server 102 provides the web page 103 comprising the configuration determiner and loader capability (step 304) for example as an ActiveX control. The web page determines the necessary application download (described further with respect to FIG. 4) and web server 102 receives a request for specific application components 104 (step 306) and provides the components 104 to PC 108 for loading into device 110 (step 308). Thereafter operations 300 end. Alternatively, web server 102 may receive configuration information about device 110 and determine which specific application components are to be downloaded.

Operations 400 commence, for example, upon a user navigating to the web page, such that PC 108 provides a web page GET request (step 402) to server 102. PC 102 receives the web page with an ActiveX control to determine configuration information and specific application components (step 404). In accordance with techniques known to those of ordinary skill in the art, ActiveX controls are preferably security checked for authentication (e.g. that the control is from a trusted domain and is appropriately signed) and/or to permit the control to operate, giving access to a connected mobile device 110 or perform other functions on the PC 108. Step 405 shows an example of a security/authorization check. PC 108, adapted by the web page, determines whether mobile device 110 is connected (step 406). If not, the user may be instructed to connect the device (step 408) and operations return to step 406.

If device 110 is connected, operations 400 continue at step 410 whereupon a user is optionally prompted to continue (not shown) and the web page adapted PC 108 communicates with device 110 via coupling 112 and determines configuration information sufficient to request or determine the specific application components 104 for downloading from website 105. Though not shown, the web page may also determine whether there is sufficient space on device 110 for the components and prompt user to make space and resume step 408 as may be applicable. Updates to existing applications may also be determined, particularly if necessary to operate with the selected application for deploying to the device. Communications between PC 108 and device 110 may be in accordance with a protocol which permits queries of various registers and stores of device 110 and instructs updates of nonvolatile storage (e.g. flash memory) or which permits more direct addressing and connection to elements of the device by PC 108 via a device driver or the like.

At steps 412 and 414 the specific application components 104 are requested and received from the server 102 and installed to device 110 at step 414. Alternatively, the configuration information may be provided for web server 102 to determine the specific application components to download.

During operations 400, various updates to the web page (i.e. screen display user interface) may occur to prompt user action or otherwise indicate PC activity. FIGS. 5 to 10 illustrate representative screen shots 500, 600, 700, 800, 900 and 1000 of various web pages or ActiveX controls for display in a browser (not shown). Screen 500 represents an authentication or permission interface. Screen 600 indicates no device is connected. Screen 700 indicates device is connected and a password is required. Screen 800 shows a device is connected and loading (including configuration determination) which may commence upon a user response. Screen 900 represents a view when an application is loading (with progress bar) and screen 1000 is shown when loading is complete.

Though the embodiment of FIGS. 3-10 shows an application deployment with configuration determination, persons of ordinary skill in the art will appreciate that device 110 may be diagnosed by a web-page in the manner described. Tests of device 110 may be performed such as by activating a test component resident on device 110 or by deploying a component (e.g. a script) and activating same. Configuration settings for device 110 may be set or specific components (e.g. a virus, outdated, unauthorized or other undesired component(s)) removed or deactivated. Web-page screen displays may be updated with test and configuration information. Such information including screen shots obtained from device 110 may be relayed to server 102 or another server for use in real-time or otherwise by a technical support personnel. Deployment and other statistics and progress etc. may be logged either locally, remotely or both relative to PC 108.

The embodiments of the invention described above are intended to be exemplary only. The scope of the invention is therefore intended to be limited solely by the scope of the appended claims.

We claim:

1. A method on a server for deploying an application to a mobile device coupled to a computing device, the computing device being in communication with the server over a communications network, the method comprising:

providing a web page to the computing device, the web page comprising instructions that, when loaded by the computing device, cause the computing device to determine configuration information about the mobile device and communicate the determined configuration information to the server;

determining one or more specific application components for loading onto the mobile device, according to the determined configuration information communicated by the computing device; and providing the one or more specific application components to the computing device for loading onto the mobile device;

wherein the instructions further cause the computing device to free storage space on the mobile device or generate a prompt to free storage space on the mobile device for loading the one or more specific application components onto the mobile device.

2. The method of claim 1 including sending a communication to the computing device for providing the specific application components for loading onto the mobile device.

3. The method of claim 1 wherein the instructions further cause the computing device to detect whether the mobile device is coupled to the computing device and, if the mobile device is not detected coupled to the computing device, to display a prompt to couple the mobile device to the computing device.

4. The method of claim 1 wherein the one or more specific application components include one or more updates to one or more application components existing on the mobile device.

5. The method of claim 1 wherein the instructions further cause the computing device to perform at least one of determining, removing and deactivating one or more undesirable components on the mobile device.

6. The method of claim 1 wherein the instructions comprises an ActiveX control.

7. A system for deploying an application to a mobile device coupled to a computing device, the computing device being in communication with the server over a communications network, the system comprising:

a processor configured to execute computer-readable instructions to cause the system to:

provide a web page to the computing device, the web page comprising instructions that, when loaded by the computing device, causes the computing device to determine configuration information about the mobile device and communicate the determined configuration information to the system;

determine one or more specific application components for loading onto the mobile device, according to the determined configuration information communicated by the computing device; and providing the one or more specific application components to the computing device for loading onto the mobile device;

wherein the web page further comprises instructions to cause the computing device to free storage space on the mobile device or generate a prompt to free storage space on the mobile device for loading the one or more specific application components onto the mobile device.

8. The system of claim 7 wherein the computer-readable instructions further cause the system to send a communication to the computing device for providing the specific application components for loading onto the mobile device.

9. The system of claim 7 wherein the web page further comprises instructions to cause the computing device to detect whether the mobile device is coupled to the computing device and, if the mobile device is not detected coupled to the computing device, to display a prompt to couple the mobile device to the computing device.

10. The system of claim 7 wherein the one or more specific application components include one or more updates to one or more application components existing on the mobile device.

11. The system of claim 7 wherein the web page further comprises instructions to cause the computing device to perform at least one of determining, removing and deactivating one or more undesirable components on the mobile device.

12. The system of claim 7 wherein the web page comprises an ActiveX control.

13. A method on a server for diagnosing a mobile device coupled to a computing device, the computing device being in communication with the server over a communications network, the method comprising:

providing a web page to the computing device, the web page comprising instructions that, when loaded by the computing device, causes the computing device to determine configuration information about the mobile device and communicate the determined configuration information to the server;

receiving from the computing device the determined configuration information;

determining at least one of: one or more changes to mobile device configuration, one or more updates to existing application components on the mobile device and one or more specific application components for loading onto the mobile device; and providing the at least one determined one or more changes, one or more updates and one or more specific application components to the computing device for implementing on the mobile device;

wherein the instructions further cause the computing device to free storage space on the mobile device or generate a prompt to free storage space on the mobile device for loading the one or more specific application components onto the mobile device.

14. The method of claim 13 wherein the instructions further cause the computing device to implement the at least one determined one or more changes, one or more updates and one or more specific application components on the mobile device.

15. The method of claim 13 wherein the instructions comprise an ActiveX control.

* * * * *